(12) United States Patent
Arcuri

(10) Patent No.: US 7,399,329 B2
(45) Date of Patent: Jul. 15, 2008

(54) PROCESS FOR PRODUCTION OF SYNTHESIS GAS USING AN OXYGEN-CONTAINING GAS

(75) Inventor: Kym Arcuri, Tulsa, OK (US)

(73) Assignee: Syntroleum Corporation, Tulsa, OK (US)

(*) Notice: Subject to any disclaimer, the term of this patent is extended or adjusted under 35 U.S.C. 154(b) by 422 days.

(21) Appl. No.: 10/923,931

(22) Filed: Aug. 23, 2004

(65) Prior Publication Data
US 2005/0066577 A1   Mar. 31, 2005

Related U.S. Application Data

(60) Provisional application No. 60/497,177, filed on Aug. 22, 2003.

(51) Int. Cl.
*C10J 3/46* (2006.01)
*C01B 3/32* (2006.01)

(52) U.S. Cl. .................. 48/197 R; 48/214 R; 48/198.1; 48/198.7; 48/61; 48/75; 48/74; 48/94; 48/95; 252/373

(58) Field of Classification Search .............. 48/197 R, 48/211, 198.1, 215, 198.7, 214 R, 214 A, 48/212, 213, 180.1; 423/650–654; 422/211
See application file for complete search history.

(56) References Cited

U.S. PATENT DOCUMENTS

| 3,871,838 A | 3/1975 | Henkel et al. |
|---|---|---|
| 4,136,015 A | 1/1979 | Kamm et al. |
| 4,166,834 A | 9/1979 | Reed et al. |
| 4,200,682 A * | 4/1980 | Sederquist ............ 429/17 |
| 4,477,262 A | 10/1984 | Pryor |
| 4,833,170 A | 5/1989 | Agee |
| 4,865,820 A | 9/1989 | Dunster et al. |
| 4,973,453 A | 11/1990 | Agee |
| 5,112,527 A | 5/1992 | Kobylinski |
| 6,085,512 A | 7/2000 | Agee et al. |
| 6,155,039 A | 12/2000 | Agee et al. |
| 2003/0188475 A1 | 10/2003 | Ahmed et al. |

* cited by examiner

*Primary Examiner*—Alexa D. Neckel
*Assistant Examiner*—Kaity Handal

(57) ABSTRACT

A process for the production of a synthesis gas from a light hydrocarbon feed, steam and an oxygen-containing stream is provided in which the feed components are mixed to form a feed mixture. The process provides an inert disengaging zone separating the mixing zone from an active catalyst zone.

2 Claims, 1 Drawing Sheet

PROCESS FOR PRODUCTION OF SYNTHESIS GAS USING AN OXYGEN-CONTAINING GAS

CROSS REFERENCE TO RELATED APPLICATIONS

This application claims priority to Provisional Application Ser. No. 60/497,177, filed on Aug. 22, 2003.

FEDERALLY SPONSORED RESEARCH

Not applicable.

REFERENCE TO MICROFICHE APPENDIX

Not applicable.

FIELD OF THE INVENTION

This invention relates to the production of synthesis gas using an oxygen-containing gas as the oxidant and light hydrocarbon gas, such as methane, as the carbon source. More particularly, this invention relates to a method and system for mixing and delivering a mixture containing light hydrocarbons, such as natural gas, with an oxygen containing gas and steam to a catalyst bed for conversion into synthesis gas through the combined reactions of partial oxidation, reforming and water gas shift.

BACKGROUND OF THE INVENTION

Synthesis gas ("syngas") is substantially comprised of carbon monoxide and molecular hydrogen and is generally produced from natural gas, gasified coals, or other sources of light hydrocarbons ("light hydrocarbon gas" or "feed gas"). "Light hydrocarbon gas" includes hydrocarbon gasses composed primarily of hydrocarbons having a carbon number of less than or equal to 4. Syngas is used as a feedstock for Fischer-Tropsch synthesis wherein the syngas is converted into higher molecular weight hydrocarbons, including, for example, olefins, paraffins and alcohols. In a Fischer-Tropsch hydrocarbon synthesis reaction carried out at low or medium pressure, i.e. in the range of about atmospheric to 500 psig, over a cobalt catalyst the optimal $H_2:CO$ molar ratio in the syngas is about 2:1.

Three basic methods have been employed for producing synthesis gas. A first known method is steam reforming wherein one or more light hydrocarbons such as methane are reacted with steam over a reforming catalyst to form carbon monoxide and hydrogen. The steam reforming reaction is endothermic and a reforming catalyst containing nickel is often utilized.

A second known method is partial oxidation wherein one or more light hydrocarbons are combusted in the presence of a stoichiometric deficiency of oxygen to produce synthesis gas. The partial oxidation reaction is typically carried out using expensive high-purity oxygen and may proceed with or without a catalyst.

In a third known method, partial oxidation and steam reforming are combined in a process known as autothermal reforming ("ATR"), wherein air or enriched air instead of high-purity oxygen, may be used as a source of oxygen for the partial oxidation reaction. In the ATR process, the exothermic heat of partial oxidation supplies the necessary heat for the endothermic steam reforming reaction. The process may be carried out in a relatively inexpensive refractory lined carbon steel vessel whereby a cost advantage is achieved.

In conventional autothermal reactors a burner is frequently used to combust the light hydrocarbon stream with an amount of an oxidant, which may be air or oxygen-enriched air or pure oxygen. The combustion product is then passed through a reforming catalyst to convert the oxidation product into a synthesis gas at equilibrium conditions at the temperature and pressure in the autothermal reactor. A major problem with such conventional ATR reactors is the formation of soot in the high temperature region associated with the burner which represents wasted carbon and can constitute an undesirable plugging material in the catalyst bed. In order to prevent excessive soot formation, a relatively high amount of steam is used. However, higher steam levels, for example, steam to natural gas ratios in excess of 0.6:1, lead to reductions in the amount of CO produced and tend to increase the $H_2:CO$ product syngas ratio above the desired 2:1 molar ratio.

The ATR process typically results in a lower hydrogen to carbon monoxide ratio in the synthesis gas than does steam reforming alone. That is, steam reforming methods generally result in an $H_2:CO$ molar ratio of about 3:1 or higher. When the feed to the ATR process is a mixture of light shorter-chain hydrocarbons, such as a natural gas stream, some form of additional control is usually necessary to maintain the ratio of hydrogen to carbon monoxide in the synthesis gas at an optimum ratio of about 2:1. For this reason, steam and/or $CO_2$ may be added to the synthesis gas reactor to adjust the $H_2:CO$ molar ratio of the syngas.

Some prior methods have employed a two-zone ATR reactor in which homogeneous combustion occurs in the first zone and reforming occurs within the second zone. However, the two-zone ATR burner typically involves a costly and complicated design to prevent mechanical degradation due to excessive temperatures. Moreover, in a two zone ATR system, the light hydrocarbon feed gas and oxygen must be completely premixed and injected within a very short residence time prior to ignition in order to prevent backlighting and/or oxidation combustion within the injection nozzle.

The burner injection system and the need for a homogeneous oxidation reaction often is a limiting factor in scale up of conventional ATR systems. Furthermore, partial reduction can lead to volatile compounds (e.g., suboxides), and subsequent mechanical degradation of the reactor walls. Additionally, the volatile suboxides may precipitate in cooler sections of the reactor downstream from the oxidation zone.

It would be desirable to provide an ATR reactor and method of producing synthesis gas which operates at a lower temperature, in an efficient manner, such that excessive amounts of soot are not produced. In particular, a reactor that can more efficiently convert a light hydrocarbon feed gas, such as natural gas, to synthesis gas without a flame and at lower temperatures would be highly desirable.

SUMMARY OF THE INVENTION

In some embodiments of the invention a process for converting methane or light hydrocarbons to synthesis gas in a reactor vessel having an active catalyst zone is provided. The process comprises mixing methane, steam, and an oxygen-containing gas to form a mixed gas in a mixing zone. The mixing zone is separated from the active catalyst zone. The mixed gas may be flowed through the disengaging zone. The disengaging zone is partially or completely filled with an inert mixing-and-shielding material which separates the mixing and transfer zone from the active catalyst. The expansion zone contains active catalyst. The catalyst may be sufficiently active that equilibrium conversion may be achieved. The POX and reforming reactions occur within the catalyst bed In some embodiments of this invention an inert material separates the active catalyst zone from the mixing of the feed gas constituents. The feed gas once mixed is flammable and will under homogenous self ignition if allowed to spend a sufficient time period at the feed gas conditions. The time frame prior to self ignition is referred to as the auto ignition time delay. Methodologies for estimating the auto ignition time delay are known to those of ordinary skill in the art, such as those disclosed in Zabetakis, Michael G. Bureau of Mines, 1967. *Safety with Cryogenic Fluids*. Plenum Press, New York; Lewis Bernard and von Elbe, Guenther, 1987. *Combustion, Flames and Explosions of Gases*. Third Edition. Academic Press; Golovitchev, V. I. and Pilia, M. L. 1996. Autoignition of Methane Mixtures: The Effect of Hydrogen Peroxide." *Journal of Propulsion & Power*; Lifshitz, Assa, Scheller, Karl and Buract, Alexander. 1971 "Shock-Tube Investigation of Ignition in Methane-Oxygen-Argon Mixtures." *Combustion & Flame*; Cowell, L. H. and Lefebvre, A. H. 1896. "Influence of Pressure on Autoignition Characteristics of Gaseous Hydrocarbon-Air Mixtures." *International Congress & Exposition, Detroit, Mich.*; Zabetakis, Michael G., 1965. "Flammability Characteristics of Combustible Gases and Vapors." *Bureau of Mines, Bulletin* 627. Such estimation methods are not sufficiently accurate for design purposes and direct measurements must be made. Some embodiments of this invention describe a design basis which is based on measured auto ignition time delays over a wide range of process variable space applicable to the generation of synthesis gas for gas to liquid hydrocarbon applications.

Embodiments of the invention provide an apparatus and process for converting natural gas or other light hydrocarbons into synthesis gas under conditions which minimize the overall pressure drop and eliminates the need to utilize a flame or homogenous partial oxidation at elevated temperatures.

Some embodiments of the invention employ a catalyst to conduct the partial oxidation and reforming necessary to convert a mixture of natural gas, steam and air into the desired synthesis gas composition containing a $H_2$:CO feed ratio of about 2:1.

In other applications of the invention an apparatus and method for operating an auto thermal reformer reaction system in a manner that minimizes the formation of soot in volumes associated with annular spacing of process pipes or other voids or interfaces which are not continuous surfaces. The use of an inert gas or steam in a dead space may be accomplished in one aspect of the invention.

BRIEF DESCRIPTION OF THE DRAWINGS

For a more complete understanding of the present invention and advantages thereof, reference is now made to the following description with the accompanying drawings in which like reference numbers indicate like features, and wherein.

DESCRIPTION OF EMBODIMENTS OF THE INVENTION

Figure 1:
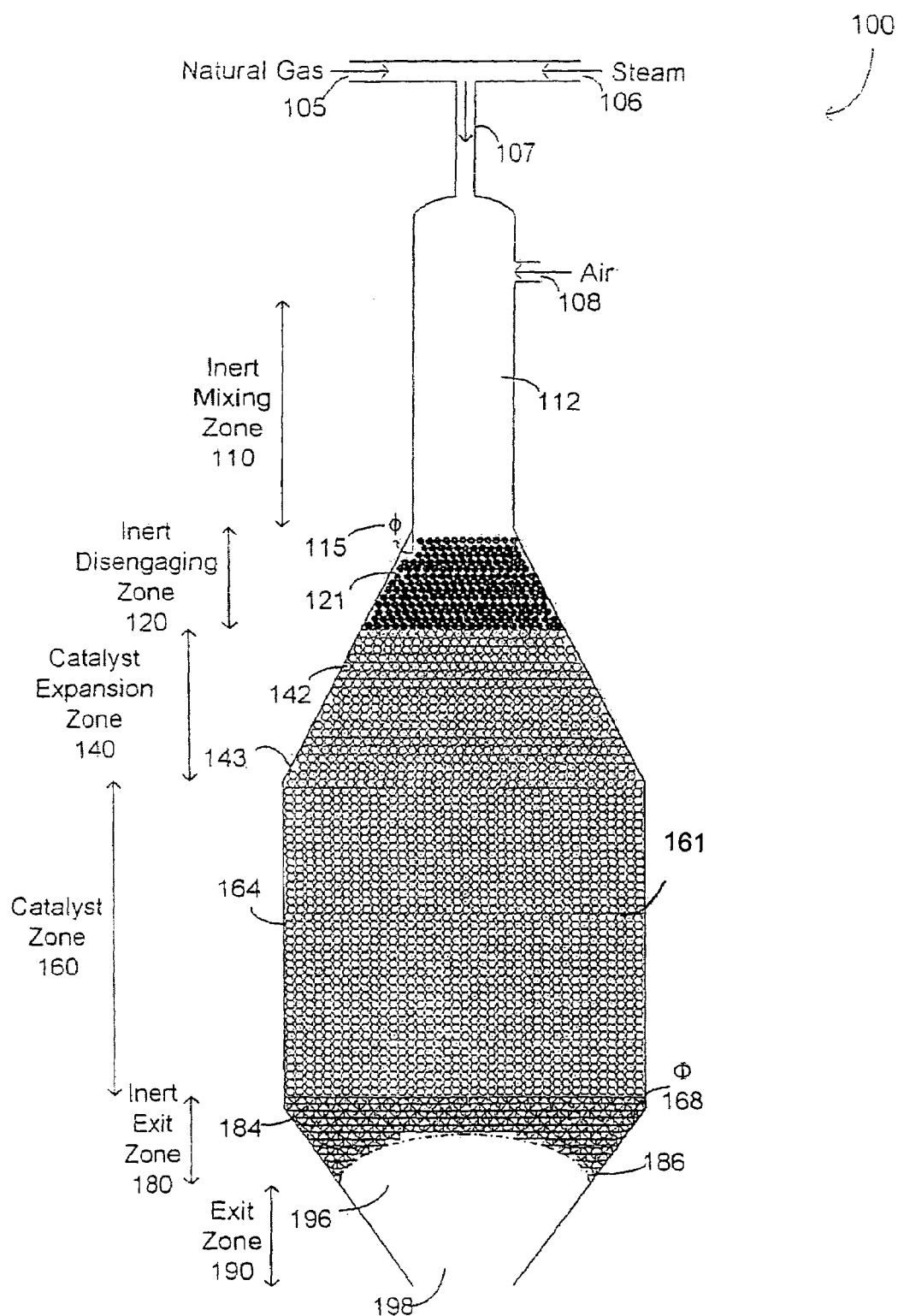
FIG. 1 is a cross-sectional diagram of an autothermal reactor for use in an embodiment of the invention.

The terms "inert material" or "inert mixing and shielding material" refer generally to a material that does not initiate any significant oxidation, reforming, or otherwise serve as an active catalytic surface with respect to soot or carbon formation. The inert mixing-and-shielding material may carry out several functions including, but not limited to, promoting mixing of the feed gases, shielding the feed nozzle from the heat of reaction, and as a flame arrester.

The term "$C_x$", where x is a number greater than zero, refers to a hydrocarbon compound having predominantly a carbon number of x. As used herein, the term $C_x$ may be modified by reference to a particular species of hydrocarbons, such as, for example, $C_5$ olefins. In such instance, the term means an olefin stream comprised predominantly of pentenes but which may have impurity amounts, i.e. less than about 10%, of olefins having other carbon numbers such as hexene, heptene, propene, or butene. Similarly, the term "$C_{x+}$" refers to a stream wherein the hydrocarbons are predominantly those having a hydrocarbon number of x or greater but which may also contain impurity levels of hydrocarbons having a carbon number of less than x. For example, the term $C_{15+}$ means hydrocarbons having a carbon number of 15 or greater but which may contain impurity levels of hydrocarbons having carbon numbers of less than 15. The term "$C_x$-$C_y$", where x and y are numbers greater than zero, refers to a mixture of hydrocarbon compounds wherein the predominant component hydrocarbons, collectively about 90% or greater by weight, have carbon numbers between x and y inclusive. For example, the term $C_5$-$C_9$ hydrocarbons means a mixture of hydrocarbon compounds which is predominantly comprised of hydrocarbons having carbon numbers between 5 and 9 inclusive, but may also include impurity level quantities of hydrocarbons having other carbon numbers.

Embodiments of the invention are well-suited for synthesis gas generation of a nominal 2 to 2.1 $H_2$:CO ratio involving the use of an oxygen-containing gas (preferably air or oxygen-enriched air) in which there is significant amount (i.e, greater than about 25%) of diluent (e.g., $N_2$). The feed gas components may be introduced into a mixing volume or device, such as a mixing tube or suitable device which allows the feed gas constituents to become completely mixed within a very short time frame and without a significant pressure drop. The velocity and temperature within the mixing volume are maintained at appropriate levels to prevent pre-ignition of the combustible mixture, which would result in a flame and high combustion temperatures. It is preferable to maintain the gas velocity of the oxygen containing mixture above the burning velocity or burn back velocity of the mixture. This minimum acceptable velocity depends upon the composition of the flame mixture as well as the temperature and pressure. The methodologies for determining the burning velocity account for the maximum temperature, pressure and residence time attainable during all phases of operation in order to prevent flash back or pre-ignition. The methodologies also include the impact of the feed composition since pre-ignition occurs more readily with increasing oxygen and $C_{2+}$ content. For example, high levels of $C_6$ (i.e., greater than about 0.1 vol %) may require a lower mixing temperature (i.e., about 700° F.) compared to natural gas sources that have only trace amounts of propane as the heaviest hydrocarbon component. The oxygen-containing air is introduced only at about 700-2000° F.; while natural gas is usually about 700-1050° F.

In one embodiment of the invention, a process is provided in which syngas is produced in a zoned autothermal reformer. Referring to FIG. 1, an autothermal reformer system 100 is shown. The system 100 includes a number of zones: a mixing zone 110, an inert disengaging zone 120, a catalytic expansion 140, an active catalyst or reaction zone 160 an inert exit zone 180 and an exit zone 190. The expansion zone 140 is supplied with a packed bed of an inert mixing-and-shielding material 141. The active catalyst zone 160 contains an active reformer catalyst 161.

A light hydrocarbon feed gas enters the reformer 101 through conduit 105 and steam feed enters through conduit 106. The light hydrocarbon feed gas predominately contains hydrocarbon gases having a carbon number of 4 and less, and may include, for example, natural gas or similar feed mixtures. The feed gas and steam feed are fed into a mixing zone 110 through conduit 107. An oxygen-containing gas, such as air, is introduced into the mixing zone 110 through a conduit 108. The three feed components, feed gas, steam feed, and oxygen-containing gas, are referred to collectively as the feed gas mixture, and are mixed within the mixing zone 110 wherein any of a number of commercially available and known means for mixing such components may be utilized. By way of example but not limitation, the mixing means in mixing zone 110 may include those disclosed in the following U.S. Pat. Nos. 3,871,838; 4,477,262; 4,166,834; 4,865,820; and 4,136,015. The disclosures of each of these patents is incorporated herein by reference. Conventional methods employing jets or nozzles at sufficiently high turbulent Reynolds numbers which are known to those skilled in the art could also be used.

The mixing of the three feed components should occur in a reasonably short residence time, i.e. less than about 300 milliseconds, so as to avoid ignition of the flammable feed gas mixture. Additionally the pressure drop across the mixing zone should be kept as low, i.e. less than about 25 psig, in order to minimize the pressure losses and power requirements for maintaining elevated pressure. The maximum allowable residence time in the mixing zone depends upon the temperature, pressure and composition of the feed gas mixture. In gas to liquid ("GTL") operations utilizing a steam to carbon ratio of less than about 0.5:1 and an oxygen to carbon molar ratio in the range of about 0.45:1 to about 0.7:1 ("typical GTL feed composition"), the preferred residence time in the mixing zone is less than about 200 milliseconds. Longer time periods may be employed when operating at lower air to carbon molar ratios, temperature and/or pressure. The use of shorter residence times in the mixing zone 110 may provide greater flexibility in the design of disengaging zone 120 and expansion zone 140.

The minimum velocity of the feed gas mixture in the mixing zone 110 is generally higher than the laminar flame velocity to prevent the undesirable propagation of the oxidation reaction back towards the inlet mixing zone 110. The flame velocity can be estimated according to the methods disclosed in Glassman, Irvin, 1996, *Combustion*, Third edition, Academic Press; Zabetakis, Michael G., Bureau of Mines, 1967, *Safety with Cryogenic Fluids*, Plenum Press, New York; Lewis Bernard and von Elbe, Guenther, 1987, *Combustion Flames and Explosions of Gases*, Third Edition, Academic Press, and such methods are known to those skilled in the art.

Under typical GTL conditions (between about 2.3:1 and about 3:1 air to carbon molar ratio and less than about 0.5:1 steam to carbon molar ratio at about 200 psig and about 900° F. feed gas temperature), the minimum velocity of the feed gas mixture is between about 30 and about 40 ft/sec. In a commercial operation, the velocity of a feed component mixture exiting a mixing zone is generally in the range of about 70 ft/sec to about 300 ft/sec. The feed gas mixture exits the mixing zone 110 and is conveyed to the disengaging zone 120.

The disengaging zone 120 separates the mixing zone 110 from the expansion zone 140 and is also referred to herein as the "process volume." In the disengaging zone 120, the velocity of the feed gas mixture is reduced to no more than about 20 ft/sec. When operating at elevated temperatures, i.e. greater than about 900° F., or pressure, greater than about 200 psig, and using a typical GTL feed composition, shorter total residence times in the mixing zone 110, i.e. less than about 200 milliseconds, and disengaging zone 120, i.e. less than about 200 milliseconds, are generally used. The disengaging zone 120 provides the appropriate volume to dissipate any radial velocity gradients which may arise in the mixing zone 110.

The disengaging zone 120 can be completely or partially filled with a solid inert material 121, such as MgO, provided that the inlet portion of the disengaging zone 120 contains inert material 121. In one embodiment of the invention, the process volume is only partially filled in order to minimize the pressure drop which occurs with high velocity gas flow through a packed bed. The maximum depth (or volume) of the inert material 121 in the disengaging zone 120 is determined by the maximum allowable residence time for the feed component mixture in which the ignition time delay is not exceeded. Those skilled in the art would understand how to calculate the volume of inert material 121 so as to meet these criteria.

Expansion zone 140 generally provides additional mixing due to the relatively high particle Reynolds number and associated turbulence encountered by the feed gas mixture in the expansion zone 140. As shown in FIG. 1, disengaging zone 120 and expansion zone 140 are formed by the flaring of the reformer 101 by an expansion angle $\phi$ 115. Expansion angle $\phi$ 115 is chosen so as to ensure that minimum back mixing occurs as the velocity of the feed gas mixture decreases. One of ordinary skill in the art would understand how to calculate expansion angle $\phi$ 115 to meet such objective.

When operating with a partially filled disengaging zone 120, the expansion angle $\phi$ 115 should preferably be set at relatively low values, i.e. less than about 30°. The actual limit of the expansion angle $\phi$ 115 depends upon the ignition time delay and depth of the inert material 121 relative to the onset of gas expansion.

In some embodiments of the invention, the depth of the inert material 121 in disengaging zone 120 is at least about 3 inches. Such minimum depth provides a thermal shield to prevent the transfer of heat from the active catalyst zone 160 to the mixing zone 110.

In another embodiment of the invention, the disengaging zone 120 is completely filled with inert material 121 with an excess of inert material 121 extending into a lower portion of the mixing zone 110. An excess of inert material 121 ensures that the disengaging zone 120 remains completely filled with solids even in the event there is settling of the inert material 121 or other packing materials in the zones underlying, and/or downstream of, the disengaging zone 120 i.e., zones 140, 160, 180 and 190. The amount of excess inert material 121 required to offset such settling typically ranges from about 1% to about 4% of the sum of the volumes of the inert disengaging 120, catalyst expansion zone 140 and active catalyst zone 160. Where the inert disengaging zone 120 is completely filled, the expansion angle 115 can be set at relatively high values, i.e. up to about 60°.

The process of the invention does not utilize an extant ignition source, such as a flame, to initiate and propagate the partial oxidation reaction which occurs in catalyst zone 160. The feed gas mixture passes through the mixing zone 110 and inert disengaging zone 120 within a time interval smaller than that associated with the ignition time delay, which is between about 200 and about 2000 milliseconds depending upon the feed gas mixture composition, pressure and temperature wherein the time delay generally increases with any of: (1) decreasing pressure and temperature; (2) increasing steam to carbon ratio; or (3) decreasing air to carbon ratio. The ignition time delay defines the maximum allowable combined residence time for the feed gas mixture through the mixing zone 110 and the inert disengaging zone 120.

In some embodiments of the invention, temperature in the active catalyst zone 160 is about 1800° F. or less, which indicates that there is not a flame. The "active catalyst volume" consists of those volumes containing active catalyst and include the active catalyst zone 160, and, optionally, a lower section 142 of the catalyst expansion zone 140. The active catalyst volume is the volume wherein partial oxidation and reforming occur. In most cases, the temperature at the inlet, or uppermost portion, of the active catalyst volume is generally between about 60° F. and about 200° F. higher than the adiabatic equilibrium temperature present throughout the active catalyst zone 160.

As previously discussed, the gas velocities through the mixing zone 110 should preferably be sufficiently high to prevent flash back. The burning velocity of the feed gas mixture defines the minimum acceptable velocity. Typically these values are on the order of 30 ft/sec under typical operating conditions used to make a 2:1 $H_2$ to CO molar ratio synthesis gas. One skilled in the art would understand how to calculate the burning velocity of the feed gas mixture.

The superficial gas velocity based on a solid free cross sectional area is above the burning velocity of the feed gas mixture, which is about 30 ft/sec. Preferably the superficial gas velocity is between about 70 and about 200 ft/sec as the feed gas mixture enters the inlet portion of the disengaging zone 120. In some embodiments of the invention, the cross sectional area for flow increases as the feed gas mixture progresses through the disengaging zone 120 in order to further reduce the superficial gas velocity to a value of less than about 30 ft/sec. In some embodiments of the invention, a depth of about 12 inches of inert material 121 is employed in the disengaging zone 120. Greater depths or larger volumes may be employed in embodiments in which additional mixing of the feed gas components prior to contacting the active catalyst is desired. The size and shape of the inert material 121 is preferably selected to minimize the pressure drop and provide an effective barrier to radiant heat transfer between the active catalyst volume and the mixing zone 11 The disengaging zone 120 provides the appropriate volume to dissipate any radial velocity gradients which may arise in the mixing zone 110. Larger particles, i.e., greater than about 25 mm, are preferred for minimizing pressure drop. Smaller particles, i.e., less than about 100 mm, are preferred to achieve better mixing. The total residence time for the feed gas mixture through the mixing zone 110 and inert solids 121 is less than the corresponding ignition time delay for the feed gas mixture composition and process conditions. The maximum volume of the inert material 121 is therefore, determined by the value of the ignition time delay.

In some embodiments of the invention, the maximum volume of inert solids 121 is established by the feed gas mixture residence time through the mixing zone 110 and the inert volume of the disengaging zone 120 under the desired turn down conditions for feed gas mixture throughput. The feed gas mixture residence time through the inert mixing zone 110 and inert disengaging zone 120 should preferably be less than the ignition time delay.

In some embodiments of the invention, the transition from inert solids to catalyst occurs within the disengaging zone 120. Parameters useful in determining the location of the active catalyst include the residence time of the gas feed mixture and the desired pressure drop. If the catalyst is located too deep in the bed relative to the flow rate, the residence time may exceed the ignition time delay and partial oxidation can occur prior to the feed gas mixture contacting the catalyst. This is an undesirable situation since excessive temperatures, i.e., greater than about 2100° F., could result causing soot formation and/or damage to the mechanical integrity of the inert solids and system components. If the catalyst is located too high in the disengaging zone 120, the gas velocity at the time of contact with the catalyst may result in an excessive pressure drop. The combination of partial oxidation and reforming results in an expansion of the gas by a factor between about 2 to about 4. Consequently the catalyst should be located at a position which provides a sufficiently short residence time to prevent homogeneous ignition while allowing sufficient reduction in the feed gas mixture velocity to avoid excessive pressure drop due to the increase in the gas velocities.

In one embodiment of the invention, the gas velocity of the feed gas mixture at the point of contact with the catalyst is between about 5 ft/sec and about 10 ft/sec and the particle size of the catalyst ranges between about 15 mm and about 35 mm. Higher feed mixture velocities may be employed in some embodiments but may result in an increase in the pressure drop. Larger particle sizes may be employed in some embodiments and will allow the use of higher contact velocities. Lower velocities can be employed in some embodiments with the effect of reducing the extent of mixing and possibility of decreasing the radial uniformity of the feed gas mixture velocities to unacceptable levels.

In some cases it may be desirable to utilize inert solids through the entire disengaging zone 120 volume. This is the preferred embodiment when higher pressure drops are acceptable or desirable in order to provide additional mixing of the feed gas components beyond that achieved in the mixing zone 110.

As the feed gas mixture contacts the catalyst volume in the catalyst expansion zone 140 or the catalyst zone 160, both partial oxidation and reforming occur simultaneously. The rate of partial oxidation is more rapid than reforming. Therefore, within the initial, or inlet, catalyst volume a greater extent of partial oxidation occurs. The temperature rise within an inlet portion of the catalyst volume is only slightly higher than that of the adiabatic equilibrium temperature in the bulk of the catalyst volume. The presence of the partial oxidation reaction within the inlet catalyst volume increases the temperature from about 60° to about 200° F. above the adiabatic equilibrium temperature. The temperature rise due to the partial oxidation reaction occurs within the inlet portion of the catalyst volume and is approximately proportional to the volumetric flow of the feed gas.

The means for mixing the feed gas components in mixing zone 110 may be any of known conventional method that employs jets or nozzles at sufficiently high turbulent Reynolds numbers.

The gas expansion due to partial oxidation and reforming results in higher gas velocities. In some embodiments the inlet portion of the catalysts placed within the lower sections of the expansion zone in order to mitigate the higher pressure drops associated with increasing gas velocity. The preferred gas velocities after partial oxidation and at least a small fraction of the reforming (approximately 10-30% approach to equilibrium) are from about 3 to about 10 ft/sec to minimize the pressure drop through the reactor. Using 25 mm particles the pressure drop ranges from about 15 to about 20 psig. The location and velocity of the feed gas at the point of contact with the catalyst is based on maintaining the feed gas residence time at valves less than the ignition time.

The catalyst zone 160 consists of sufficient catalyst to allow equilibrium conversion of the feed gas to synthesis gas having an $H_2$:CO ratio of about 2:1. For most cases the amount of catalyst required to achieve equilibrium conversion at representative conditions for a Fischer Tropsch synthesis gas corresponds to a gas hourly space velocity of about 10,000 hr$^{-1}$ or higher, depending upon the activity of the catalyst. The other critical factor defining the volume of active catalyst is the minimum acceptable amount required to catalyze the partial oxidation at startup. This depends upon startup conditions. For a typical set of startup conditions (T feed: 800° F., P 60 psig, Air/NG 0.7, Steam/NG 1) the catalyst volume should be that corresponding to about 2500 GHSV. The criteria which defines the larger minimum catalyst volume should be employed in establishing the total amount of catalyst.

The inert mixing-and-shielding material 141 generally has the following characteristics: (1) ability to withstand the temperatures to which the inert mixing-and-shielding material 141 is exposed (up to between about 2000° and about 2200° F.), (2) catalytically inert, and (3) non-reactive to high steam partial pressures. The inert mixing-and-shielding material 141 may take any shape or size consistent with an acceptable pressure drop for the specific application. Acceptable inert mixing-and-shielding materials 141, include, for example, alumina, zirconium oxide, magnesium oxide, and other refractory type oxides. Such inert materials may also comprise nickel. For example, a commercially available Ni/MgO based catalyst (available from Johnson Mathey, Inc. Taylor, Mich. under the designation catalyst #734 is useful in the present invention. Other catalysts useful in the invention are disclosed in U.S. Pat. Nos. 6,085,512; 6,155,039; 4,833,170; and 4,973,453, the disclosures of which are incorporated herein by reference and are attached hereto as Appendix A.

In general, when the feed gas mixture contacts the catalyst bed in catalyst zone 160 the temperature may increase from a range of about 700° to about 1100° F. up to a temperature of about 1900° to about 2100° F. The excess heat generated at the interface of the catalyst may radiate upwards and cause the temperatures to rise in the mixing zone, in some applications. The mixing zone 110 may undesirably become a combustion zone due to the extreme exothermic heat generated during the reaction. It is usually desirable to avoid these excessively high temperatures in the mixing zone 110, and the inert material located between the mixing zone 110 and the active catalyst zone assists in avoiding such a temperature problem.

In some applications, the inert mixing and shielding material 141 may serve as a flame arrester during upset conditions in the reactor. The flame arrester may comprise a pipe that functions like a filter element to stop a flame from proceeding backwards in a gas stream of combustion gas. One further advantage of the inert mixing and shielding material in the application of the invention is that it may provide additional mixing of gas to provide a more homogenous gas stream that is provided into the catalyst bed for reaction.

The commercial practice of employing homogenous combustion (solid, i.e. soot, free) combustion zones often leads to high temperatures. Additionally, the contacting of a pre-mixed feed gas with an active oxidation catalyst may lead to high temperatures causing homogenous soot formation in the gas phase.

As one aspect of the present invention, it has been discovered that the addition of MgO based particles as the inert mixing and shielding material, at the inlet of the reactor, can serve to minimize soot formation and allow stable operations at equilibrium conversions. The MgO may be any commercial grade of MgO, but sometimes also may contain a small percentage of another metal or alloy, such as Nickel (Ni). One suitable MgO source is obtained from Johnson Matthey, Billingham, Cleveland, UK under the catalyst designation #734.

The inert mixing-and-shielding material 141 in the inlet of the ATR 101 has been seen to improve process efficiency, in part, by not producing soot and achieving equilibrium conversion of a natural gas/oxygen/nitrogen/steam mixture to synthesis gas.

Relatively high inlet velocities (greater than about 40 ft/sec) are desirable to prevent flashback through the transfer volume between the reactors active catalyst zone and the points where the constituent feeds are mixed. The minimum velocity to prevent flashback is usually referred to as the "flashback velocity" for the combustible mixture, and it depends upon the mixture composition and the temperature, pressure, surface/volume ratio as well as other geometrical considerations.

FIG. 1 presents a preferred embodiment for gas to liquid operations involving the use of air as the oxygen source with typical natural gas feeds. This preferred embodiment allows the gas to expand in both the inert disengaging zone and the catalyst expansion zone in order to minimize the overall pressure drop across the reactor system. Other embodiments can be employed when other design objectives are desired. For example, if utilizing a higher oxygen content such as oxygen-enriched air the residence time between the mixing zone and the active catalyst may have to be reduced. In such embodiments, the invention may utilize a design in which the inert disengaging zone 120 is eliminated and gas expansion occurs solely in the catalyst expansion zone 140. In alternative embodiments, the catalyst expansion zone 140 may be eliminated with sufficient gas expansion occurring in the inert engaging zone 120. The extent of gas expansion depends upon the desired pressure drop across the reactor and the ignition time delay. The expansion angles $\phi$ 115 and $\Phi$ 168 are determined by both the desired pressure drop while expansion angle $\phi$ 115 depends upon the required pre-pox residence time for avoiding pre-ignition.

Although the present invention and its advantages have been described in detail, it should be understood that various changes, substitutions and alterations can be made therein without departing from the spirit and scope of the invention as defined by the appended claims.

What is claimed is:

1. A process for producing a synthesis gas from a light hydrocarbon stream comprising the steps of:
    mixing a light hydrocarbon stream, steam, and an oxygen-containing gas to form a feed gas mixture in a mixing zone;
    passing the feed gas mixture through an inert disengaging zone; and
    passing the feed gas mixture to an active catalyst zone;
    wherein the disengaging zone is at least partially filled with an inert mixing and shielding material, the inert mixing and shielding material is alumina, zirconium oxide, magnesium oxide, nickel or mixtures thereof; and
    wherein the active catalyst zone is at least partially filled with a single partial oxidation catalyst.

2. A process for producing a synthesis gas from a light hydrocarbon stream comprising the steps of:
    mixing a light hydrocarbon stream, steam, and an oxygen-containing gas to form a feed gas mixture in a mixing zone;
    passing the feed gas mixture through an inert disengaging zone; and
    passing the feed gas mixture to an active catalyst zone;

wherein the disengaging zone is at least partially filled with an inert mixing and shielding material, the inert mixing and shielding material has a particle size between about 25 mm and about 100 mm; and wherein the active catalyst zone is at least partially filled with a single partial oxidation catalyst.

* * * * *